United States Patent
Moro-Le Gall et al.

(10) Patent No.: US 10,465,812 B2
(45) Date of Patent: Nov. 5, 2019

(54) RUPTURE DISK FOR A DEVICE FOR PROTECTING AGAINST OVERPRESSURES INSIDE A DEVICE, USE IN AN APPARATUS INTENDED FOR CONSECUTIVELY CONTAINING TWO GASES OF SEPARATE CHEMICAL NATURE

(71) Applicant: COMMISSARIAT A L'ENERGIE ATOMIQUE ET AUX ENERGIES ALTERNATIVES, Paris (FR)

(72) Inventors: Isabelle Moro-Le Gall, Fontaine (FR); Laurent Briottet, Moirans (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/521,556

(22) PCT Filed: Oct. 26, 2015

(86) PCT No.: PCT/EP2015/074714
§ 371 (c)(1),
(2) Date: Apr. 24, 2017

(87) PCT Pub. No.: WO2016/062895
PCT Pub. Date: Apr. 28, 2016

(65) Prior Publication Data
US 2017/0314694 A1    Nov. 2, 2017

(30) Foreign Application Priority Data
Oct. 24, 2014  (FR) .................................... 14 60239

(51) Int. Cl.
*F16K 17/14*    (2006.01)
*F16K 17/16*    (2006.01)
*G21C 9/008*    (2006.01)

(52) U.S. Cl.
CPC .............. *F16K 17/16* (2013.01); *G21C 9/008* (2013.01); *Y02E 30/40* (2013.01)

(58) Field of Classification Search
CPC .............. F16K 17/16; Y10T 137/1714; Y10T 137/1722; Y10T 137/1744; Y10T 137/1752; G21C 9/008; Y02E 30/40
(Continued)

(56) References Cited

U.S. PATENT DOCUMENTS 4,219,040 A * 8/1980 Fallon ................... B67D 1/125
137/209
4,416,388 A * 11/1983 Mulawski .............. B65D 83/70
137/68.11

(Continued)

FOREIGN PATENT DOCUMENTS

JP    H10156443    * 6/1998    ............. F16K 17/14

OTHER PUBLICATIONS

Jan. 11, 2016 International Search Report issued in International Patent Application No. PCT/EP2015/074714.

*Primary Examiner* — Minh Q Le
(74) *Attorney, Agent, or Firm* — Oliff PLC

(57) ABSTRACT

A rupture disc for a device for protecting against overpressures inside an apparatus, the disc is made of a generally circular part including two planar surfaces substantially parallel to one another, and two notches each located along a circumference, the circumferences of the two notches being different from one another, the notch located on the larger circumference being made on one of the planar surfaces, referred to as lower surface, while the notch located on the smaller circumference is made on the other one of the planar surfaces, referred to as upper surface.

18 Claims, 4 Drawing Sheets

Figure 1:
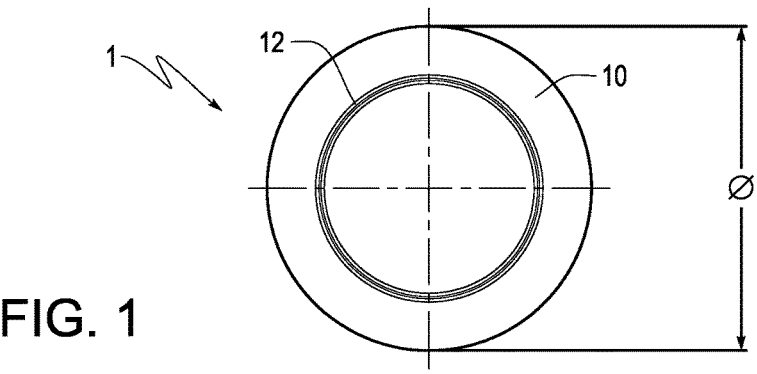

(58) Field of Classification Search
USPC ................... 137/68.23, 68.24, 68.27, 68.28
See application file for complete search history.

(56) References Cited

U.S. PATENT DOCUMENTS

| | | | | |
|---|---|---|---|---|
| 4,512,491 | A * | 4/1985 | DeGood | F16L 29/007 137/68.22 |
| 4,576,303 | A * | 3/1986 | Mundt | B65D 83/70 137/68.23 |
| 4,738,372 | A * | 4/1988 | Jernberg | F17C 13/123 137/68.11 |
| 5,320,126 | A * | 6/1994 | Krimm | F16K 17/1626 137/68.29 |
| 5,787,563 | A * | 8/1998 | Jenkins | B60R 21/268 219/91.2 |
| 5,934,308 | A * | 8/1999 | Farwell | F16K 17/16 137/68.26 |
| 6,265,097 | B1 * | 7/2001 | Konno | B65D 51/1638 137/68.19 |
| 6,378,544 | B1 * | 4/2002 | DiBello | F16K 17/16 137/68.25 |
| 6,571,816 | B2 * | 6/2003 | Morishita | H01M 2/1241 137/68.25 |
| 7,140,380 | B2 * | 11/2006 | Marubayashi | H01M 2/1241 137/68.25 |
| 8,091,574 | B2 * | 1/2012 | Melrose | F16K 17/1606 137/15.18 |
| 8,522,808 | B2 * | 9/2013 | Ikeda | H01M 2/1241 137/68.27 |
| 2007/0059586 | A1 * | 3/2007 | Matsumoto | H01M 2/1241 429/53 |
| 2008/0156375 | A1 * | 7/2008 | Wild | B65B 39/06 137/68.27 |
| 2008/0182159 | A1 * | 7/2008 | Mitani | H01M 2/0413 429/56 |
| 2010/0140238 | A1 * | 6/2010 | Mozley | F16K 17/16 219/121.72 |
| 2010/0140264 | A1 | 6/2010 | Hernandez | |
| 2012/0080625 | A1 * | 4/2012 | Imoto | F16K 17/164 251/129.15 |
| 2014/0151346 | A1 * | 6/2014 | Modena | B23K 26/0626 219/121.61 |
| 2016/0018014 | A1 * | 1/2016 | Modena | F16K 17/1606 137/68.27 |

* cited by examiner

RUPTURE DISK FOR A DEVICE FOR PROTECTING AGAINST OVERPRESSURES INSIDE A DEVICE, USE IN AN APPARATUS INTENDED FOR CONSECUTIVELY CONTAINING TWO GASES OF SEPARATE CHEMICAL NATURE

TECHNICAL FIELD

The present invention relates to the field of safety devices used to protect apparatuses under pressure against excessive pressure and/or excessive vacuum.

It deals more particularly with a novel rupture disk forming a device of this type.

STATE OF THE ART

The implementation and the description of all the devices used to protect apparatuses under pressure against excessive pressure notably forms the subject of the French standard NF EN ISO 4126.

A review of this standard shows that currently there are essentially four types of devices that can be itemized as follows:
1) rupture disks,
2) safety valves,
3) devices combining the use of rupture disks and of safety valves,
4) the so-called "controlled safety pressure relief systems" (CSPRS).

The rupture disks, which are the subject of the standard NF EN ISO 4126-2 are devices actuated by differential pressure between the interior and the exterior of the apparatus that they protect and are designed to operate by rupture, that is to say by material tearing.

More specifically, a rupture disk consists of a part which contains the pressure, which is sensitive to the pressure inside the apparatus under pressure and which is designed to open by rupturing at a determined pressure. This rupture makes it possible to release the gas contained in the apparatus under pressure and thus leads to a drop in the internal pressure thereof.

Among the existing rupture disks, they can be distinguished according to their particular geometries, which constitute the majority of the market:
  the rupture disks of domed form, with a form domed outward from the apparatus under pressure that they protect,
  the rupture disks of inverse domed form, that is to say with a domed form toward the interior of the apparatus under pressure that they protect,
  the rupture disks of planar form.

The existing rupture disks can be produced from a single material or multiple materials. They are all designed to rupture at a single pressure value P, which is the specified rupture pressure, for the intended use. The value of P is a function of the temperature but independent of the nature of the gas contained in the apparatus under pressure. In practice, the value of P is supplied by the manufacturer with a performance tolerance.

Thus, the rupture disks make it possible, through a simple technical means, to protect apparatuses under pressure against excessive vacuum, or excessive pressure. In the latter case, as mentioned above, the rupture of the disk occurs as soon as pressure internal to the apparatus equals the specified rupture pressure, to within the tolerance value, and does so independently of the chemical nature of the gas contained in the apparatus.

Hydrogen gas embrittlement of steels, often referred to by the acronym HE, is a phenomenon caused by the interaction between the hydrogen and the steels. The interaction consists of the adsorption of hydrogen at the surface of the steel and possibly the diffusion of the hydrogen in the volume thereof. Based on multiple parameters linked to the material, such as its microstructure, its mechanical characteristics, etc., and to its environment, such as the fugacity of the hydrogen, the temperature, etc., this interaction can result in a premature rupture of the steel, and therefore a clear rupture of the apparatuses concerned. This premature rupture, generically referred to by the term embrittlement, is generally reflected in terms of mechanical behavior of the steel by a reduction in its ductility. The scale of this reduction depends on the parameters cited previously.

The literature on this subject very clearly shows the importance and the criticality of this phenomenon in many fields, such as petrochemicals, metallurgy or even the nuclear industry.

Thus, the manufacturer of an apparatus under pressure, whose metal walls, generally of steel, can be effected by the embrittlement, must take this phenomenon into consideration.

In particular, such an apparatus may be required to undergo, during its operation, and successively, the pressure of an inert gas followed by hydrogen.

In this case, the manufacturer of the apparatus may want, through a safety measure, to lower the maximum allowable pressure under hydrogen compared to that under inert gas.

Now, to date, there is no device for protecting apparatuses under pressure against excessive pressure designed, according to the chemical nature of the gas in the apparatus, to automatically accommodate the pressure value which leads to the rupture of the device.

There is therefore a need to improve the protection devices of the apparatuses under pressure, notably in order to adapt them, according to the chemical nature of the gas in the apparatus, to automatically accommodate the pressure value which leads to their rupturing of the device.

The general aim of the invention is to at least partly address this need.

A particular aim is to propose a device which addresses the general aim, which is simple to produce, reliable and inexpensive.

SUMMARY OF THE INVENTION

To do this, the subject of the invention is a rupture disk for a device for protecting against overpressures inside an apparatus, the disk consisting of a part of generally circular form comprising two planar faces substantially parallel to one another, and two scores each located on a circumference, the circumferences of the two scores being different to one another, the score located on the larger circumference being produced on one of the planar faces, called bottom face, whereas the score located on the smaller circumference is produced on the other of the planar faces, called top face.

According to an advantageous embodiment, the score located on the top face is designed to rupture at a first pressure $P0$ whereas the score located on the bottom face is designed to rupture at a second pressure $P1$ different from $P0$.

Regarding the placement of the rupture disk according to the invention, the bottom face of the disk which has the circumferential score of larger diameter is placed in direct contact with the pressure contained in the apparatus to be protected.

The top face of the disk is not therefore subject to the pressure internal to the apparatus and is at atmospheric pressure under inert gas or air.

Thus, the inventors of the present invention have thought shrewdly to differentiate the fracture initiation scores of a rupture disk according to the pressurized gases contained in the apparatus.

They have also analyzed the possible location of these fracture initiation scores and have come to the conclusion that it was necessary to locate a fracture initiation score, or score, on each of the two planar faces of the disk.

In effect, if the scores were both located on the top face of the disk intended not to be in direct contact with the pressure of the apparatus, then these scores would not be embrittled by the gas or gases, such as the hydrogen. Consequently, the main point of embrittlement of the disk would occur on its opposite face, i.e. the bottom face, at the level of its embedment with the bearing element of the protection device. The rupture pressure would then become extremely sensitive to the presence of defects (scratches) on the bottom face of the disk at the level of the embedment, and the rupture pressure under gas, such as the hydrogen, would therefore be very random. In other words, it would not be possible to guarantee a good reliability.

On the other hand, if the scores were both located on the bottom face of the disk, it would be very difficult to manage to dimension the disk for the bottom of the two scores to be stressed by traction and not by compression. The embrittlement by the gas, such as the hydrogen, would then be transferred to the level of the embedment on the bottom face of the disk, and the same issue as previously of rupture pressure control would arise.

It goes without saying that a person skilled in the art will take care to dimension the geometrical parameters of the disk, such as the thickness, the diameter, and those of the scores, such as the depth, the score bottom radius, the location in the disk, in order to obtain the desired rupture pressures.

A person skilled in the art can perform this dimensioning using finite element computation software. This may be software called Cast3M developed by the applicant and commercially available. It may also be software with the commercial name Abaqus. Any other finite element computation software may be suitable.

The inventors carried out the dimensioning of a rupture disk according to the invention using the Cast3M software according to the following procedure:
  firstly, an evaluation of the mechanical characteristics of the material of the rupture disk was carried out under inert gas, by performing traction and rupture mechanics tests, notably toughness tests,
  secondly, an evaluation of the sensitivity of the material to hydrogen gas embrittlement was conducted, by performing traction tests under various hydrogen pressures and for multiple rates of deformation. The aim of these tests under hydrogen pressures is to outline the general behavior of the material under hydrogen.

A simulation via finite element software was then carried out on the disk with its scores, subjected to an increasing gas pressure on its bottom face. The changes with the gas pressure of the tapered stress and deformation fields of the two scores are analyzed.

An iterative process of modification of the parameters of the geometry of the scored disk, such as the radius of the scores and their depth, is then carried out until the various geometrical parameters of the disk make it possible to obtain the rupture pressures desired under hydrogen and under inert gas.

The inventors of the present invention have therefore defined a specific rupture disk geometry which allows an automatic adjustment of the rupture pressure of the disk as a function of the chemical nature of the pressurized gas in the apparatus.

Thus, if the gas is an inert gas, the rupture pressure of the disk is equal to P0. If the gas is hydrogen, the rupture pressure is equal to P1. P0 is strictly greater than P1. The difference in absolute value between P0 and P1 is greater than the tolerance on the rupture pressure under inert gas.

The accommodation of the value of the rupture pressure of the disk according to the chemical nature of the pressurized gas in the apparatus is done automatically without the need for intervention from a third party.

One and/or the other of the scores may be continuous or discontinuous over its circumference.

The part forming the rupture disk may advantageously be made of a steel chosen from the ferritic, martensitic, ferrito-bainitic, bainitic, ferrito-martensitic, ferrito-perlitic, preferably of API X80 grade, and perlitic steels.

A rupture disk and its scores according to the invention may have the following preferred dimensions:
  the part has a thickness of 1 to 5 mm,
  the depth of the scores is less than or equal to a value corresponding to approximately 70% of the thickness of the part,
  the bottom radius of the scores is between 0.1 and 0.6 mm,
  the aperture angle of the scores being less than or equal to 500.

These preferred dimensions are implemented advantageously, for rupture pressures under inert gas and $H_2$ of between 250 and 550 bar, and for a part made of steel sensitive to HE, such as a steel chosen from the ferritic steels, certain martensitic steels, ferrito-perlitic steels.

Also a subject of the invention, according to another of its aspects, is an apparatus, intended to contain, in succession, two gases of different chemical nature, such as helium and hydrogen, comprising:
  a wall in which an aperture is formed;
  a device protecting the apparatus against overpressures comprising:
    a rupture disk as described previously, whose bottom face is in direct contact with the pressure contained in the apparatus,
    at least one bearing element, designed to press the disk against the wall with the scores of the disk on the aperture.

The device protecting the apparatus may advantageously comprise:
  sealing means arranged between the periphery of the disk and the wall around the aperture,
  at least one holding element, called closing cap, bearing against the bearing element, and fixed by tightening to the equipment so as to hold the bearing element and the rupture disk on the apparatus and guarantee the sealtightness at the level of the sealing means.

Preferably, the bearing element is a ring whose bottom face bears against the top face of the disk and whose aperture is arranged facing the aperture of the wall.

The apparatus may also comprise sealing means arranged between the periphery of the ring and the closing cap. These sealing means preferably consist of one or more O-ring seals.

According to a variant embodiment, the closing cap and the apparatus are pierced respectively with tapped holes facing one another to house the screws for tightening the closing cap on the apparatus.

A final subject of the invention is the use of the apparatus described above to contain, under pressure, two gases of different chemical nature, such as helium (He) and hydrogen ($H_2$). An advantageous use is that where the apparatus is a hydrogen production and storage apparatus.

DETAILED DESCRIPTION

Figure 2:
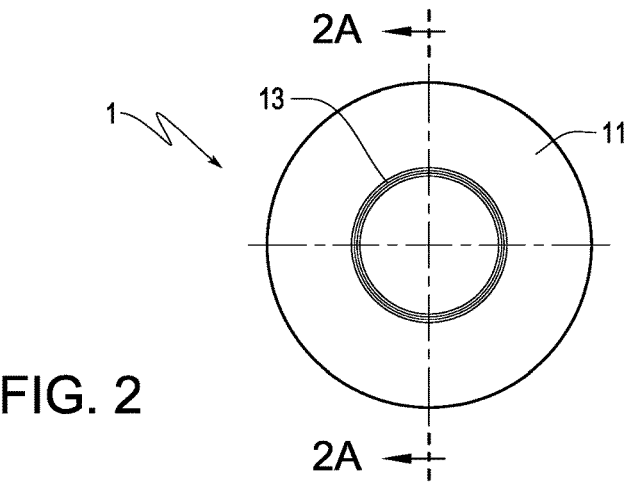
Figure 2A:
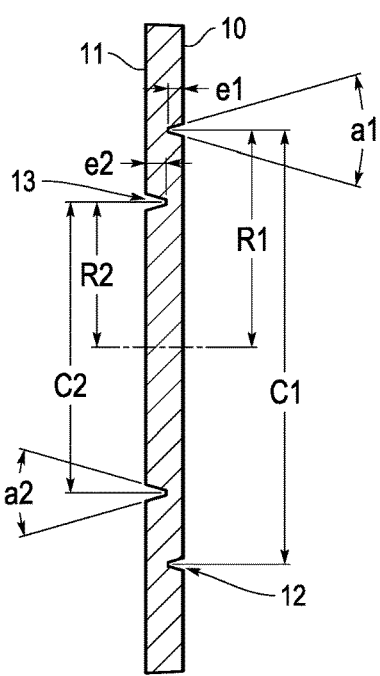
Figure 3:
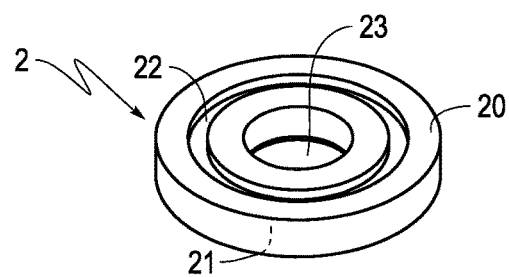
Figure 3A:
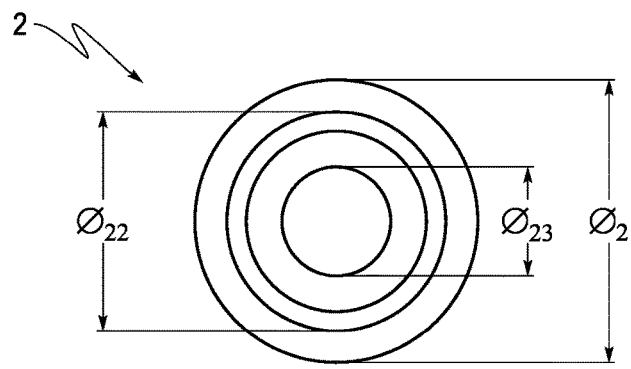
Figure 3B:
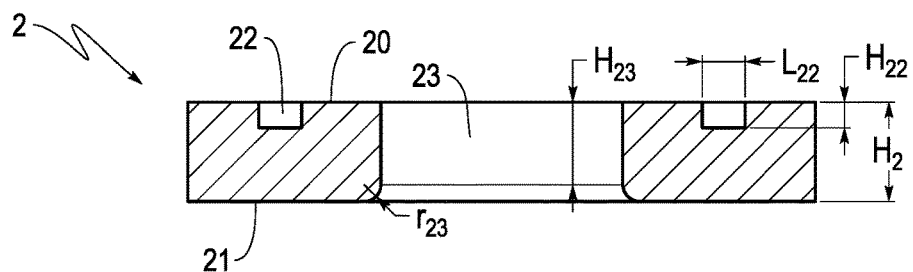
Figure 4A:
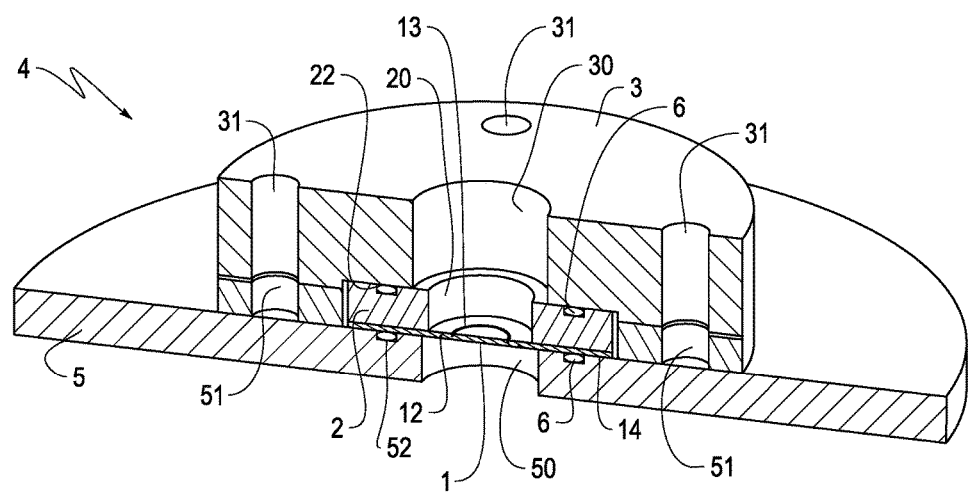
Figure 4B:
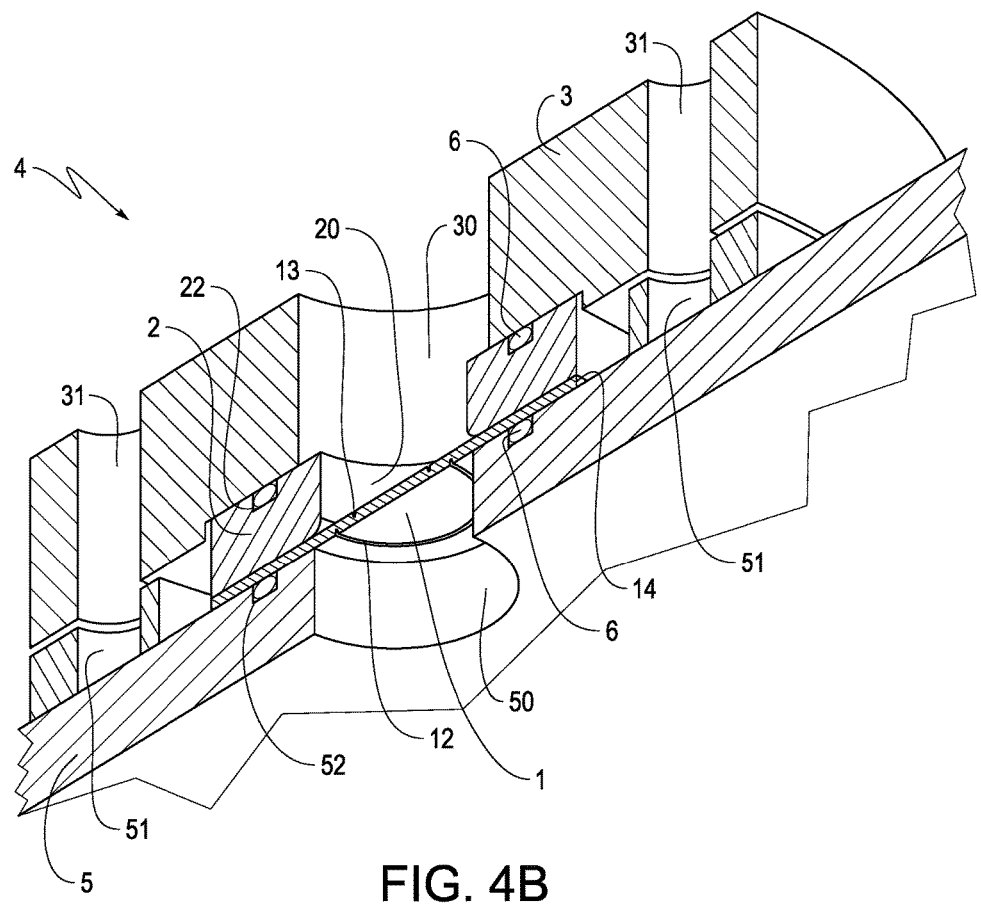
Figure 5:
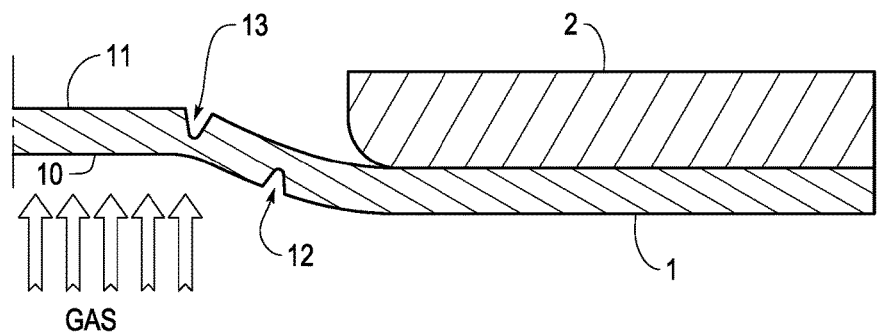
Figure 6A:
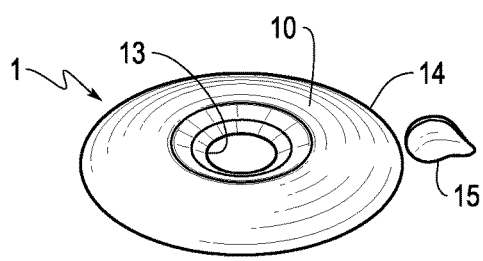
Figure 6B:
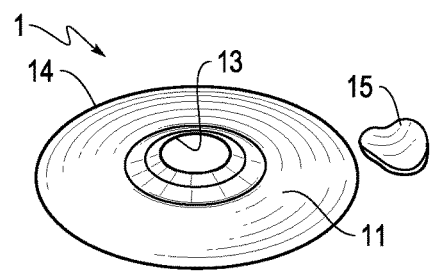
Figure 7A:
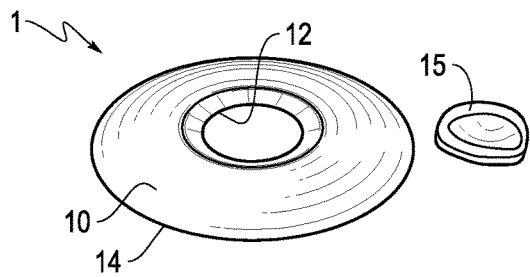
Figure 7B:
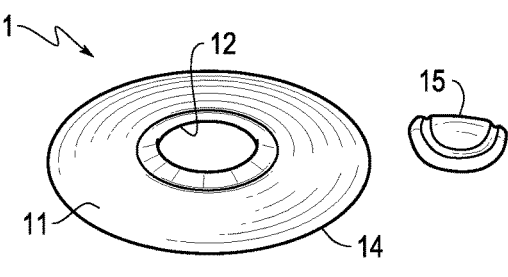

Other advantages and features of the invention will emerge more clearly on reading the detailed description of the invention given in an illustrative and nonlimiting manner with reference to the following figures in which:

FIG. 1 is a view of a face of an exemplary rupture disk according to the invention, FIG. 2 is a view of the opposite face of the rupture disk according to FIG. 1, FIG. 2A is a view in longitudinal cross section of the rupture disk according to FIGS. 1 and 2, FIG. 3 is a perspective view of an exemplary bearing ring according to the invention, designed to press the rupture disk of FIGS. 1 to 2A against a wall around an aperture of an apparatus under pressure to be protected, FIG. 3A is a front view of the bearing ring according to FIG. 3, FIG. 3B is a view in longitudinal cross section of the bearing ring according to FIGS. 3 and 3A, FIGS. 4A and 4B are perspective and partial cross-sectional views of an apparatus under pressure onto which is fixed a protection device comprising the rupture disk and the bearing ring according to the invention, FIG. 5 is a schematic view in longitudinal cross section of a rupture disk with a bearing ring according to the invention, showing the action of an overpressurized gas on the disk during validation tests, FIGS. 6A and 6B are photographic reproductions of a rupture disk according to the invention having ruptured under a given pressure of helium, respectively seen from the side of the bottom face and of the top face, FIGS. 7A and 7B are photographic reproductions of a rupture disk according to the invention having ruptured under a given pressure of hydrogen, respectively seen from the side of the bottom face and of the top face.

As illustrated in FIGS. 1 to 2A, the rupture disk 1 according to the invention is a circular part of diameter Ø whose planar face 10 is scored with a continuous score 12 of circular form C1, of aperture angle α1, of score bottom radius R1 and of score depth e1.

The other planar face 11 of the disk 1 is also scored with a continuous score 13 of circular form C2, of aperture angle α2, of score bottom radius R2 and of score depth e2.

The circumferences C1, C2 of the two scores 12, 13 are concentric and with a center that coincides with that of the disk 1.

As an example, the dimensions are as follows:
thickness of the disk e1+e2: 1.5 mm, diameter Ø: 58 mm.
diameter C1: 18 mm, depth e1: 0.65 mm, bottom radius R1: 0.1 mm, aperture α1 of 30°.
diameter C2: 12 mm, depth e2: 0.85 mm, bottom radius R2: 0.1 mm, aperture α2 of 30°.

The disk 1 can advantageously be made of ferrito-perlitic steel for a use with hydrogen.

The constituent material of the ring can be a steel of any microstructure.

FIGS. 3 to 3B show a bearing ring 2 designed to press the rupture disk 1 according to the invention against a wall of an apparatus under pressure to be protected.

This ring 2 is of circular section with a diameter Ø2, a thickness H2 and comprises a top face 20 and a bottom face 21. This bottom face 21 defines the plane making it possible to hold the top face 11 of the disk 1.

The top face 20 is provided with a peripheral groove 22, of rectangular section of height H22 and of width L22. This groove 22 can house a sealing O-ring seal 6 designed to produce the final seal of the apparatus protection device as detailed hereinbelow.

The ring 2 is pierced with a central aperture 23 also of circular section 23 of diameter Ø23 over most of its height H23, a connection in the form of a radius of curvature r23 being produced at the join with the bottom face 21. The diameter Ø23 and the radius of curvature r23 are to be dimensioned according to the rupture pressures desired for the disk under inert gas and under hydrogen.

As an example, the dimensions are as follows:
ring diameter Ø2: 58 mm, thickness H2: 9.25 mm,
groove width L22: 4 mm, groove height H22: 2.4 mm, groove outer diameter Ø22: 45 mm
diameter of the central aperture Ø23: 22.5 mm, height H23: 7.75 mm, radius of curvature r23: 1.5 mm.

The ring 2 is made of type 316L stainless austenitic steel preferably with its surface nitrided. This surface treatment makes it possible to harden the steel at the surface and thus ensure that, in case of rupture of the disk 1, the ring 2 will not be damaged.

Other materials may be considered for the production of the ring 2. Whatever the material considered for the ring, it is chosen such that the mechanical strength of the ring 2 is greater than that of the disk 1, that is to say that, at a given pressure, the disk 1 is deformed and under no circumstances the ring 2.

FIGS. 4A and 4B show an example of fixing of a protection device 4 incorporating the rupture disk 1 and the ring 2 according to the invention, to an apparatus 5 intended to contain, successively, two gases of different chemical nature, namely helium and hydrogen.

A wall of the apparatus 5 is pierced with a circular aperture 50 over which the bottom face 10 of the disk is positioned and held. The bottom face 10 with its score 12 is therefore in direct contact with the pressure inside the apparatus 5.

The top face 11 of the disk 1 is held against the wall of the apparatus 5 around the aperture 50 by the ring 2. More specifically, the peripheral part 14 of the disk is embedded between the wall of the apparatus 5 and the ring 2 whereas the scores 12, 13 are centered on the aperture 50 of the wall and the central aperture 20 of the ring 2.

The disk 1 and the ring 2 are held in place on the apparatus 5 to be protected by a closing cap 3 screwed into the wall of the apparatus. The closing cap 5, also of generally circular form, comprises a central aperture 30 positioned facing the central aperture 20 of the ring 2.

Although not represented, the tightening screws are screwed into the tapped holes 31, 51 respectively produced in the closing cap 3 and the wall of the apparatus 5.

The seal between the interior of the apparatus 5 and the exterior is produced via two O-ring seals 6.

One of the seals 6 is positioned between the apparatus 5 under pressure and the rupture disk 1. As illustrated in FIGS. 4A and 4B, this seal 6 may be housed in a groove 52 provided for this purpose in the wall of the apparatus 5.

The other of the seals 6 is positioned between the ring 2 and the closing cap 3. It is not essential to provide this other seal 6. If it proves necessary not to have any gas leak between the cap 3 and the ring 2, then installation of this other seal 6 between these two elements 2, 3 is vital. Such is the case for example if the apparatus 5 is located inside a building/structure/installation and if the gas must then be channeled in a pipe to be discharged outside.

On the other hand, if for example the apparatus 5 is located outdoors, then the installation of this other seal 6 is not vital. Such is the case for example when the apparatus 5 is a gas storage tank placed in the open air. As illustrated in FIGS. 4A and 4B, this other seal 6 may be housed in the groove 22 of the ring 2.

The seals 6 may be of elastomer. Advantageously, if the apparatus 5 is designed to remain for long periods under hydrogen pressure, at least the seal 6 between the rupture disk 1 and the apparatus 5 is made of indium.

The tightening torque applied to the closing cap 3 makes it possible to ensure both that the protection device 4 is held against the apparatus 5 and that the seals 6 are tight.

The inventors carried out validation tests on a protection device 4 according to the invention. It is specified here that, for these validation tests, the dimensions of the rupture disk 1 and of the ring 2 are those given by way of examples above. It is also specified that, for these validation tests, the rupture disk 1 was made of API X80 grade ferrito-perlitic steel and the ring 2 was made of 316L steel with its surface nitrided.

The device 4 was validated by using a disk bursting cell, a test means originally developed by the applicant in its research center located in Valduc. The test scheme in this bursting cell is shown in FIG. 5.

An increasing helium pressure with a rise in pressure rate of 20 bar/min, was applied under the disk 1 until its rupture. Three tests were carried out in succession on three different disks.

Then, three new tests were performed under an increasing hydrogen pressure (99.9999% pure) on three different disks.

The results of the tests are presented in the table below.

TABLE

| Gas | Rupture pressure $P_R$(bar) | Location of the Rupture |
|---|---|---|
| Helium | 487 | Score 13 |
|  | 500 |  |
|  | 516 |  |
| Hydrogen | 335 | Score 12 |
|  | 296 |  |
|  | 392 |  |

In this table, it emerges that the rupture pressure of the disk 1 under hydrogen is systematically significantly lower, by approximately 30%, than that observed under helium.

Furthermore, under helium it occurs on the top score 13, whereas under hydrogen, the rupture always occurs at the bottom score 12. That is shown respectively in FIGS. 6A and 6B for the rupture under helium and in FIGS. 7A and 7B for the rupture under hydrogen, where the difference in size of the torn cappings 15 can be seen.

Two additional tests were carried out under hydrogen in order to confirm that the preceding test results are independent of the rate of pressure rise of the gas. Thus, the two additional tests were as follows:

a first test was carried out at $6.7 \times 10^{-2}$ bar/min. The results are comparable to those obtained under hydrogen at 20 bar/min.

a second test was carried out at 2400 bar/min. The results of the test are also comparable to those obtained under hydrogen at 20 bar/min.

In conclusion, the protection device 4 according to the invention described above therefore does indeed make it possible to accommodate the maximum allowable pressure in the pressurized enclosure as a function of the nature of the gas contained, i.e. inert gas or hydrogen.

The apparatus 5 intended to be protected by the protection device 4 may advantageously be an apparatus used in the field of hydrogen energy production and storage.

Other variants and enhancements may be implemented without in any way departing from the scope of the invention which has just been described.

According to a preferred use, an apparatus with a rupture disk according to the invention as overpressurization protection device is designed to successively contain helium (He) and hydrogen ($H_2$).

However, an apparatus with a rupture disk according to the invention may be used advantageously to contain all other existing inert gases.

In particular, it may be used with all the gases containing a partial $H_2$ pressure.

The invention claimed is:

1. A rupture disk for a device for protecting against overpressure inside an apparatus, the disk consisting of a part of generally circular form comprising two planar faces substantially parallel to one another, and two scores each located on a circumference, wherein the circumferences of the two scores are different from one another, the score located on the larger circumference being produced on one of the planar faces, called bottom face, whereas the score located on the smaller circumference is produced on the other of the planar faces, called top face, the score located on the top face further being configured to rupture at a first pressure P0 under a first gas whereas the score located on the bottom face being configured to rupture at a second pressure P1 different from P0 under a second gas.

2. The rupture disk as claimed in claim 1, one and/or the other of the scores being continuous over its circumference.

3. The rupture disk as claimed in claim 1, one and/or the other of the scores being discontinuous on its circumference.

4. The rupture disk as claimed in claim 1, wherein the circumferences of the two scores are concentric to one another.

5. The rupture disk as claimed in claim 1, wherein the circumferences of the two scores are centered on the center of the circular part.

6. The rupture disk as claimed in claim 1, wherein the part is made of a steel chosen from the ferritic, martensitic, ferrito-bainitic, bainitic, ferrito martensitic, ferrito-perlitic, and perlitic steels.

7. The rupture disk as claimed in claim 1, wherein the part has a thickness of 1 to 5 mm.

8. The rupture disk as claimed in claim 1, wherein the depth of the scores is less than or equal to a value corresponding to approximately 70% of the thickness of the part.

9. The rupture disk as claimed in claim 1, wherein the radius at the bottom of the scores is between 0.1 and 0.6 mm.

10. The rupture disk as claimed in claim 1, wherein the aperture angle of the scores is less than or equal to 50°.

11. An apparatus, intended to contain, in succession, two gases of different chemical nature, comprising:

a wall in which an aperture is formed;

a device for protecting the apparatus against overpressures comprising:
- a rupture disk as claimed in claim 1, the bottom face of which is in direct contact with the pressure contained in the apparatus,
- at least one bearing element, designed to press the disk against the wall with the scores of the disk over the aperture.

12. The apparatus as claimed in claim 11, wherein the protection device comprises:
- sealing means arranged between the periphery of the disk and the wall around the aperture,
- at least one holding element, called closing cap, bearing against the bearing element, and fixed by tightening to the apparatus so as to hold the bearing element and the rupture disk on the apparatus and ensure the seal at the level of the sealing means.

13. The apparatus as claimed in claim 12, wherein the closing cap and the apparatus is pierced respectively with tapped holes facing one another to house the screws for tightening the closing cap on the apparatus.

14. The apparatus as claimed in claim 11, wherein the bearing element is a ring whose bottom face bears against the top face of the disk and whose aperture is arranged facing the aperture of the wall.

15. The apparatus as claimed in claim 11, further comprising sealing means arranged between the periphery of the ring and the closing cap.

16. The apparatus as claimed in claim 15, the sealing means consisting of one or more O-ring seals.

17. A method comprising containing under pressure, two gases of different chemical nature, by the apparatus as claimed in claim 11.

18. The method as claimed in claim 17, wherein the apparatus is a hydrogen production and storage apparatus.

* * * * *